(12) United States Patent
Szczepanik et al.

(10) Patent No.: US 10,956,088 B2
(45) Date of Patent: *Mar. 23, 2021

(54) STORAGE LEVEL LOAD BALANCING

(71) Applicant: International Business Machines Corporation, Armonk, NY (US)

(72) Inventors: Grzegorz Piotr Szczepanik, Cracow (PL); Kushal Patel, Pune (IN); Sarvesh S. Patel, Pune (IN); Lukasz Jakub Palus, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,546

(22) Filed: May 15, 2019

(65) Prior Publication Data

US 2020/0363984 A1 Nov. 19, 2020

(51) Int. Cl.
  *G06F 3/06* (2006.01)
  *G06F 13/40* (2006.01)
  *G06F 13/16* (2006.01)

(52) U.S. Cl.
  CPC .......... *G06F 3/0659* (2013.01); *G06F 3/0604* (2013.01); *G06F 3/067* (2013.01); *G06F 3/0653* (2013.01); *G06F 13/1668* (2013.01); *G06F 13/4027* (2013.01); *G06F 2213/0026* (2013.01); *G06F 2213/0042* (2013.01)

(58) Field of Classification Search
  CPC .... G06F 3/0659; G06F 3/0604; G06F 3/0653; G06F 3/067; G06F 13/1668; G06F 13/4027; G06F 2213/0026; G06F 2213/0042
  See application file for complete search history.

(56) References Cited

U.S. PATENT DOCUMENTS

| | | | |
|---|---|---|---|
| 8,229,415 B1 * | 7/2012 | Chen | G06Q 30/0282 455/422.1 |
| 8,539,197 B1 * | 9/2013 | Marshall | G06F 13/00 711/112 |
| 8,868,797 B1 | 10/2014 | Kirac | |

(Continued)

OTHER PUBLICATIONS

Tai et al., "Live Data Migration for Reducing SLA Violations in Multi-Tiered Storage Systems," 2014 IEEE International Conference on Cloud Engineering, Mar. 2014, Boston, MA, pp. 361-366.

(Continued)

*Primary Examiner* — Michael Krofcheck
(74) *Attorney, Agent, or Firm* — Van Leeuwen & Van Leeuwen; Christopher M. Pignato

(57) ABSTRACT

An approach is provided in which a storage system detects that an extent residing on a first one of a set of physical storage devices requires relocation. The storage system identifies a set of backend connection properties of each of a set of backend connections between the storage system and the set of physical storage devices. The set of backend connection properties includes at least a connection bandwidth between the storage system and at least one of the physical storage devices. In turn, the storage system relocates the extent from the first physical storage device to a second one of the set of physical storage devices based at least in part, on the set of backend connection properties.

13 Claims, 8 Drawing Sheets

(56) References Cited

U.S. PATENT DOCUMENTS

| | | | |
|---|---|---|---|
| 8,935,493 B1 | 1/2015 | Dolan | |
| 9,047,017 B1 | 6/2015 | Dolan | |
| 9,513,814 B1 * | 12/2016 | Can | G06F 3/061 |
| 9,720,601 B2 | 8/2017 | Gupta | |
| 9,817,766 B1 | 11/2017 | Si | |
| 9,952,803 B1 | 4/2018 | Dolan | |
| 10,664,185 B2 * | 5/2020 | Patel | G06F 3/0653 |
| 2002/0156975 A1 * | 10/2002 | Staub | G06F 9/5083 |
| | | | 711/114 |
| 2005/0071550 A1 | 3/2005 | Lowe | |
| 2010/0281230 A1 * | 11/2010 | Rabii | G06F 12/121 |
| | | | 711/165 |
| 2015/0317169 A1 * | 11/2015 | Sinha | H04L 61/2076 |
| | | | 713/2 |
| 2016/0231948 A1 * | 8/2016 | Gupta | G06F 3/067 |
| 2018/0018379 A1 | 1/2018 | Eda | |
| 2018/0196606 A1 | 7/2018 | Chen | |
| 2018/0203614 A1 | 7/2018 | Aronovich | |
| 2019/0384521 A1 * | 12/2019 | Patel | G06F 3/0647 |
| 2020/0042224 A1 * | 2/2020 | Dalmatov | G06F 3/0689 |

OTHER PUBLICATIONS

"Easy Tier function," International Business Machines Corporation, 2015, 2 pages.
"List of IBM Patents or Patent Applications Treated as Related," Letter from Leslie A. Van Leeuwen, Jun. 26, 2019, 1 page.
Szczepanik et al., "Storage Level Load Balancing," U.S. Appl. No. 16/453,306, filed Jun. 16, 2019, 34 pages.

\* cited by examiner

| Controller to Interconnect Map 400 | | |
|---|---|---|
| Controller ID | Interconnect Bandwidth | Protocol |
| 1 | 25 GB | iSCSI |
| 2 | 8 GB | FC |
| 3 | 1 GB | iSCSI |
| 4 | 10 GB | iWARP (RDMA) |

405 — 410 — 415 —

| Controller to LUN Map 420 | |
|---|---|
| Controller ID | LUN ID List |
| 1 | LUN 1, LUN 2, LUN 4 |
| 2 | LUN 3, LUN 6, LUN 7 |
| 3 | LUN 5 |

425 — 430 —

| Extent, LUN, and Data Access Count 440 | | |
|---|---|---|
| Extent ID | LUN ID | Data Access Count |
| 1 | LUN 2 | 129 |
| 2 | LUN 4 | 22 |
| 3 | LUN 5 | 10 |

STORAGE LEVEL LOAD BALANCING

BACKGROUND

A storage area network (SAN) is a dedicated network that provides access to consolidated, block level data storage. SANs are primarily used to make storage resources (e.g., disk arrays, tape libraries, optical jukeboxes, etc.) accessible to servers such that the resources appear as locally attached devices to operating systems.

A SAN typically includes file systems, which are logical storage abstraction mappings to the physical storage resources (storage virtualization). In a block-based storage environment, a single "block" of information is addressed using a logical unit (LUN) identifier and an offset within that LUN, known as a logical block addressing (LBA). The LUN identifier identifies a logical unit from multiple LUNs and is essential for managing block storage arrays of a storage area network (SAN). A typical LUN may be used with any storage resource that supports read/write processes.

Storage area networks typically utilize an analytics system to monitor load balancing between the various physical storage resources. Multiple disks enclosures are connected to the analytics system, which are volumes that are visible from the storage system and available to an application. Multiple virtualized volumes may be exposed to the upper layers (e.g., host applications), which the upper layers use to store data.

Multi-tiered storage is a storage approach where data is stored on various types of storage devices primarily based on criteria such as (i) frequency of use, (ii) security, and (iii) data recovery requirements. Data that is frequently accessed by an application whose response is time sensitive is typically stored on solid state drives (SSDs). Other data that is infrequently accessed and for which a higher response time is more tolerable is typically stored on high capacity 7.2K RPM (revolutions per minute) drives because the cost per gigabyte of storage is much higher for SSDs than it is for the 7.2K RPM hard disk drives (HDDs).

One type of a multi-tier storage solution evaluates storage workloads and automates the placement of data amongst different storage tiers to achieve the optimal performance. Since SSDs are costlier than HDDs, this solution allows dynamic relocation of data of across tiers based on the data usage by placing "hot" (frequently accessed) data with high I/O (input/output) density and low response time requirements on SSDs while targeting HDDs for "cooler" data that is accessed more sequentially and/or at lower rates.

In one embodiment, the multi-tier storage solution uses an I/O monitoring daemon that monitors I/Os performed on HDDs. Based on data access frequency, the daemon identifies data that is heavily accessed (hot) and stores the hot data on SSDs for high throughput, low response times, and IOPS (Input/Output Operations Per Second) energy efficient characteristics. As a result, the amount of expensive storage required to meet a given level of performance is minimized compared to other methods of data placement for tiered storage.

Load balancing is a mechanism that relocates "extents" between physical storage devices within a same tier of a multi-tier storage solution. An extent is a set of 1024 blocks and is a unit for data relocation/migration in a block storage system. Extent migration between the same tier LUNs is also referred to as intra-tier migration. When a storage device is highly utilized in proportion to other storage devices in the same tier, then a portion of its hot extents are moved to a lower-utilized storage device if the lower-utilized storage device is not anticipated to reach a performance limit after the migration. The load balancing process improves performance as hotter extents are distributed among multiple disks of the same tier and plays an important role to minimize overload scenarios.

BRIEF SUMMARY

According to one embodiment of the present disclosure, an approach is provided in which a storage system detects that an extent residing on a first one of a set of physical storage devices requires relocation. The storage system identifies a set of backend connection properties of each of a set of backend connections between the storage system and the set of physical storage devices. The set of backend connection properties includes at least a connection bandwidth between the storage system and at least one of the physical storage devices. In turn, the storage system relocates the extent from the first physical storage device to a second one of the set of physical storage devices based, at least in part, on the set of backend connection properties.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) detecting, by a storage system, that an extent located on a first one of a set of physical storage devices requires relocation; (ii) identifying, by the storage system, a set of backend connection properties of each of a set of backend connections between the storage system and the set of physical storage devices, wherein the set of backend connection properties comprise at least a connection bandwidth between the storage system and at least one of the physical storage devices; and (iii) relocating the extent from the first physical storage device to a second one of the set of physical storage devices based, at least in part, on the set of backend connection properties.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting various tables that store information generated and utilized by a storage system to relocate extents;

DETAILED DESCRIPTION

Figure 1:
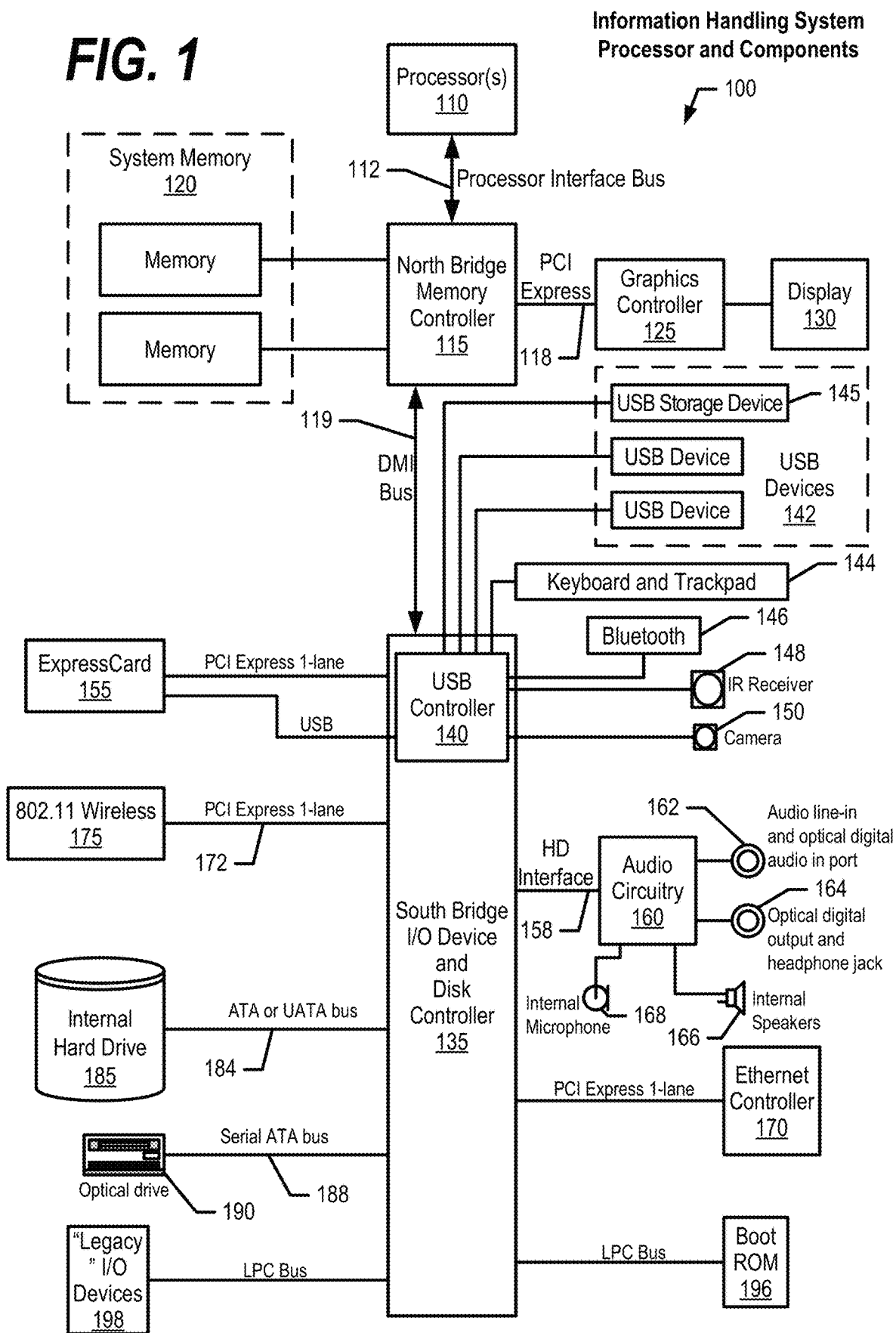
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
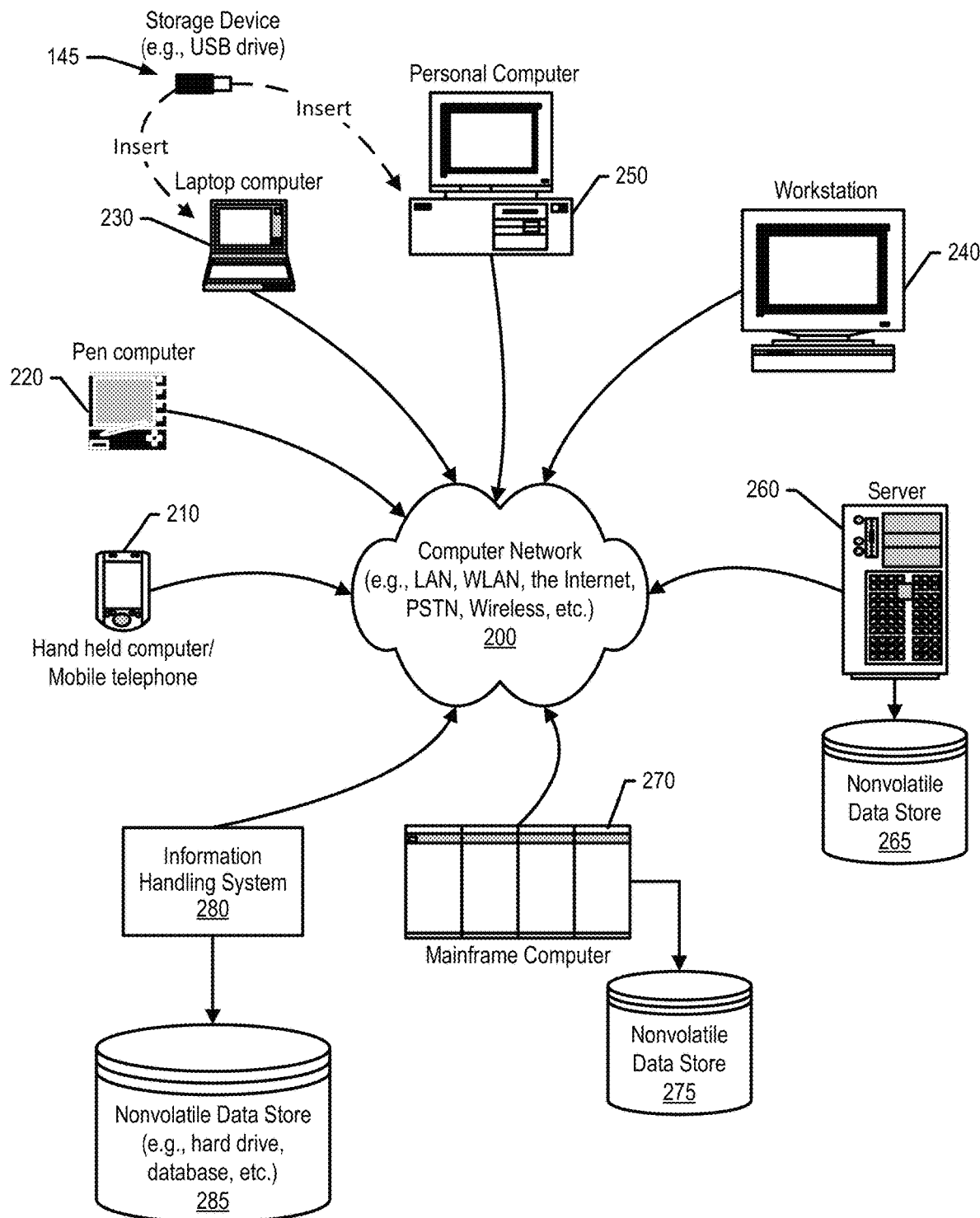
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, load balancing is a mechanism that relocates extents within the same storage tier. A challenge found is that in the process of rebalancing the extents across storage devices of the same tier, prior approaches use the extents' access counts as a sole basis of rebalancing the extents across the various storage devices. The prior approaches do not consider backend connection properties between the backend controllers and the storage devices that attribute to the overall data access times, such as new backend interconnect communication protocols such as iSCSI (Internet Small Computer System Interface) and iSER (iSCSI Extensions for RDMA), or new data transfer technologies such as RDMA (remote direct memory access) and NVMeF (non-volatile memory express over fabric). For example, when three backend controllers are attached to a virtualization storage system, each of the backend controllers is capable of serving a different set of physical storage devices with different backend connection properties that prior approaches do not consider while determining extent relocations.

In addition, some host applications generate a specific type of I/O and have specific I/O requirements. For example, application A may send a large amount of I/O transactions with a smaller I/O size, which requires substantial storage level CPU (central processing unit) to process the smaller I/O operations. However, application B may generate large size I/O transactions that are bandwidth sensitive and, therefore, require more backend controller interconnect bandwidth between the backend controller to the storage device.

In another example, if the extent is currently stored on a high speed interconnected (16 gigabits per second (Gbps)) backend and is being moved to a slow interconnected (4 Gbps) backend, then the I/O latency between the application may increase because of performance issues at the backend connection. In yet another example, when a heavily utilized extent is moved to a controller that is connected over a costly CPU protocol, then the CPU of the target storage could become overtaxed to process heavy I/O operations due to the large protocol overhead.

In yet another example, when an extent is being moved from a source RDMA capable device to a non-RDMA capable target, then the move may add latency cost to the application I/O due to increased I/O processing requirements of the target and degrade overall performance. In addition, if the system moves the extent from an RDMA capable device to non-RDMA backend controller, then the overall I/O latency increases due to increments in the software processing stack of non-RDMA I/O. This increased I/O processing requires more resources at the target and therefore may cause I/O timeout issues and performance degradation.

In yet another example, if a switched fabric in a datacenter is not functioning properly and the connected backend re-negotiates its speed from 16 Gbps down to 4 Gbps, the prior approaches do not consider the new speed and applications experience I/O latency. In addition, if the system moves an extent to an external controller as part of load balancing activity and the target controller is not connected over a slower speed fabric (e.g., from 16 Gbps to 4 Gbps attached controller), then the application accessing the data suffers the lower I/O interconnect as the new I/O destination is connected over a 4 Gbps line, which is far less than the source.

Because prior approaches do not consider backend connection properties while determining extent relocations within a same tier of a storage system, the prior approaches do not optimally relocate extents in the same tier to provide increased performance benefits to applications accessing the data. In turn, the prior approaches may cause improper adjustment and unpredicted application performance after the extents are moved to destination storage devices.

FIGS. 3 through 8 disclose an approach that considers backend connection properties between a virtualization storage system and backend storage arrays to optimize extent relocation. A storage system evaluates backend connection properties such as interconnect bandwidth, protocol I/O stack overhead, and additional interconnect capabilities (e.g., RDMA, NUMA (non-uniform memory access) to perform optimal load balancing across physical storage devices of the same tier (intra-tier migration). The approach discussed herein ensures optimal extent migration within the connected storage arrays behind the virtualization storage system with respect to their protocol connectivity, connection speed, and interconnect technology.

The storage system utilizes rebalancing and tiering daemons in the storage virtualization engine to evaluate interconnect bandwidth of the backend controllers while performing extent relocation. The storage system also considers additional technology knowledge awareness during extent relocation such as the protocol I/O stack overhead and additional interconnect capabilities such as, RDMA, NUMA, etc. In one embodiment, the storage system provides an inbound or out-of-bound discovery API (Application Program Interface) solution to collect the capabilities of the storage system as well as the ability to change tiering thresholds and load balancing thresholds based on the discovered interconnect speed of the backend controllers.

In one embodiment, the storage system adjusts threshold values (tiering and balancing thresholds) based on negotiated speeds of the backend controllers and triggers the threshold value change in case a backend controller's operational attachment speed changes. For example, if a connected backend controller changes speed of operation from 16 Gbps to 4 Gbps, then the storage system re-computes the threshold values accordingly and updates the movement targets.

In another embodiment, the storage system calculates extent sensitivities of extents using current interconnect speeds and other factors and updates extent targets. For example, when an extent is bandwidth sensitive, the extent is placed on a backend storage array having a large interconnect bandwidth to its backend controller.

In another embodiment, the storage system notifies upper application layers regarding threshold changes via means of in-bound APIs which are then utilized to carve further knowledge. The storage system discovers and advertises the performance and hardware/software capabilities present at a backend level via means of interface or protocol enhancements such as SCSI (Small Computer System Interface) or NVMeF (Non-Volatile Memory express over Fabrics), and also changes tiering thresholds and re-balances thresholds based on the discovered statistics such as interconnect speed, associated protocol stack, and protocol requirements.

Figure 3:
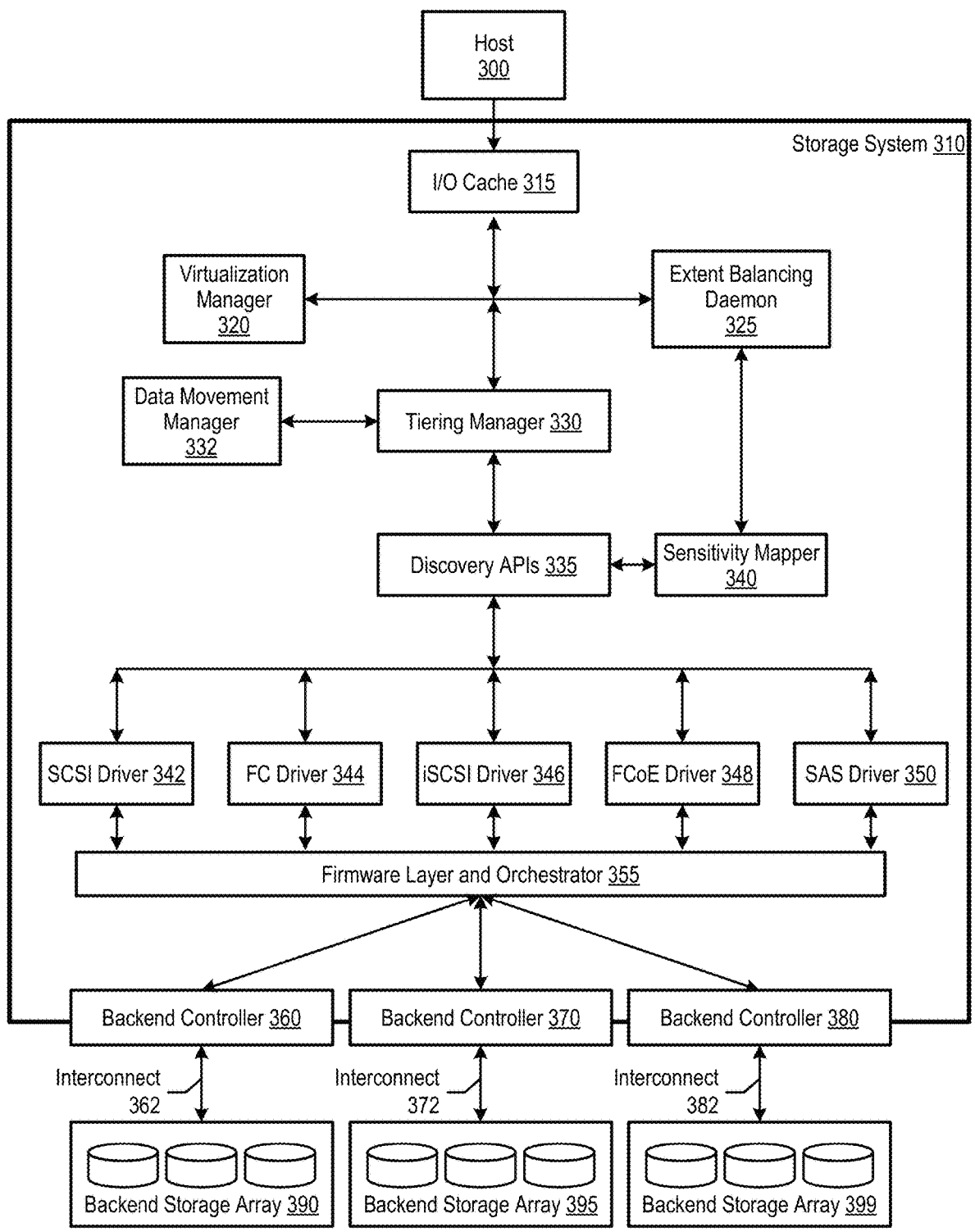
FIG. 3 is an exemplary diagram depicting a storage system that load balances extents within a storage tier based in part on backend connection properties between a storage system and backend storage arrays.

FIG. 3 is an exemplary diagram depicting a storage system that load balances extents within a storage tier based in part on backend connection properties between storage system 310 and backend storage arrays 390, 395, and 399. Host 300 executes applications and interfaces to storage system 310 to access data stored in one or more of backend storage arrays 390, 395, and 399.

Storage system 310 includes I/O cache 315, which is a common cache module that caches data between host 300 and backend storage arrays 390, 395, and 399. Virtualization manager 320 is responsible for storage virtualization management such as physical address to virtual address translations. Extent balancing daemon 325 manages intra-tier extent relocation based on load conditions on physical storage devices within the same storage tier.

Tiering manager 330 manages extent relocations from one storage tier to a different storage tier (e.g., tier 1 SSDs to tier 2 HDDs) based on need of the extent from an application executing on host 300. Data movement manager 332 evaluates the "sensitivity" (e.g., bandwidth requirements, protocol overhead, etc.) of an extent when it receives an extent movement request from tiering manager 330.

Discovery APIs 335 discover the backend controllers and identify which backend controllers are attached to which backend storage arrays. Discovery APIs 335 log the information in various tables shown in FIG. 4 (see FIG. 5 and corresponding text for further details). Sensitivity mapper 340 manages a metadata map that includes backend controller I/O serving characteristics. In one embodiment, sensitivity mapper 340 includes information such as interconnected protocol, type of backend, etc., along with workload information such as IOPS and BW sensitive workload.

SCSI driver 342, Fibre Channel (FC) driver 344, iSCI driver 346, Fibre Channel over Ethernet (FCoE) driver 348, and Serial Attached SCSI (SAS) driver 350 are common protocol drivers that support the various protocols used by backend controllers 360, 370, and 380. Firmware layer and orchestrator 355 is a firmware layer in the storage system that communicates with the backend controllers. Firmware layer and orchestrator 355 translates the information to a backend understandable form and sends it to respective backend arrays for processing.

Backend controllers 360, 370, and 380 connect to backend storage arrays 390, 395, and 399, respectively, using interconnects 362, 372, and 382. Each of backend controllers 360, 370, and 380 adhere to a specific protocol with specific interconnect bandwidths connecting to their corresponding backend storage arrays 390, 395, and 399. Each of backend storage arrays 390, 395, and 399 include a set of physical storage devices, and each of the physical storage devices includes a set of LUNs that are exposed to the upper layer storage system.

To re-balance extents across the LUNs of the same tier, storage system 310 (e.g., extent balancing daemon 325) evaluates capabilities such as CPU power and RAM. Storage system 310 analyzes cache structures based on the nature of I/O expectations on the extent and relocates the extent to a suitable backend LUN. In one embodiment, handles balancing the extents in the backend LUN. In another embodiment, extent balancing daemon 325 works in conjunction with tiering manager 330 to provide an integrated solution.

Extent balancing daemon 325 provides equilibrium across the backend LUNs connected to storage system 310 on the basis of the loads experienced by the extent. If the extents in a volume are heavily accessed by an application, then upon triggering a balancing function or tiering function, the workload on the extents is examined based on past access window times and the extents are dispersed across the backend LUNs that can be accessed by host 300 with improved performance due to extent distribution and equality of load across the LUNs in the storage pool.

When tiering manager 330 initiates an extent movement request to data movement manager 332, data movement manager 332 evaluates the "sensitivity" of the extents. The extent sensitivity may include bandwidth, I/OPS, I/O processing cost, etc. Once the extent sensitivity is determined for the movement candidates, then storage system 310 identifies similar (or better) performing backend controllers based on the expected performance, disk type of the controller and controller capabilities, and migrates the extent accordingly to sustain (or improve) the application performance (see FIGS. 5 through 8 and corresponding text for further details).

Storage system 310 calculates the extents with their source and destination LUNs via discovering backend connection properties such as interconnection speed and other required information (e.g., RDMA capabilities and protocol overhead). With the collection of all the backend connection properties, the sensitivity of the extent is identified and target storage devices are updated accordingly. If the target storage devices do not include better a controller type, better processing status and desired characteristics, then storage system 310 checks for a different backend controller for extent placement to ensure acceptable application performance after movement. If the target backend destination has space available and no other candidate extent has claimed it for movement by balancing and/or tiering, then storage system 310 relocates the extent to a selected LUN in the target storage device that is a better performing destination and applications accessing data will experience better performance.

FIG. 4 is an exemplary diagram depicting various tables that store information generated and utilized by storage system 310 to relocate extents. As one skilled in the art can appreciate, other approaches may be used to store backend connection information such as a database. Table 400 maps backend controllers to their corresponding backend connection properties (or a portion thereof). Column 405 includes a list of backend controllers. Column 410 includes a list of interconnect bandwidths for each of the backend controllers specified in column 405, and column 415 includes a list of the interconnect protocols corresponding to each of the backend controllers.

Table 420 maps the backend controllers to LUNs assigned to their corresponding backend storage arrays. Column 425 includes a list of backend controllers and column 430 includes a list of LUNs stored on physical storage devices corresponding to the backend controllers' backend storage arrays. For example, backend controller 1 interfaces to backend storage array 390 and LUNs 1, 2, and 4 are stored on backend storage array 390's physical storage devices.

Table 440 includes a list of extents (column 445), the LUN on which they are currently stored (column 450), and their corresponding data access counts, or heat map (column 455). Storage system 310 monitors the data access counts and, when an extent, or group of extents on the same physical storage device, reaches a data access count threshold, storage system 310 proceeds through a series of steps to relocate one or more extents if required (see FIGS. 5, 6, and corresponding text for further details).

Based on the tables shown in FIG. 4 (or similar tables), storage system 310 identifies an extent relocation candidate's current source backend connection properties and identifies potential target locations with similar or better backend connection properties. For example, extent 1's data access count may trigger a relocation signal, and table 440 shows that extent 1 is stored in LUN 2. Table 420 shows that LUN 2 is controlled by controller 1, and table 400 shows that controller 1 has an interconnect bandwidth of 25 GBPS with an iSCSI protocol. In turn, storage system 310 uses the source backend connection properties to identify viable target locations (see FIGS. 5, 6, and corresponding text for further details).

Figure 5:
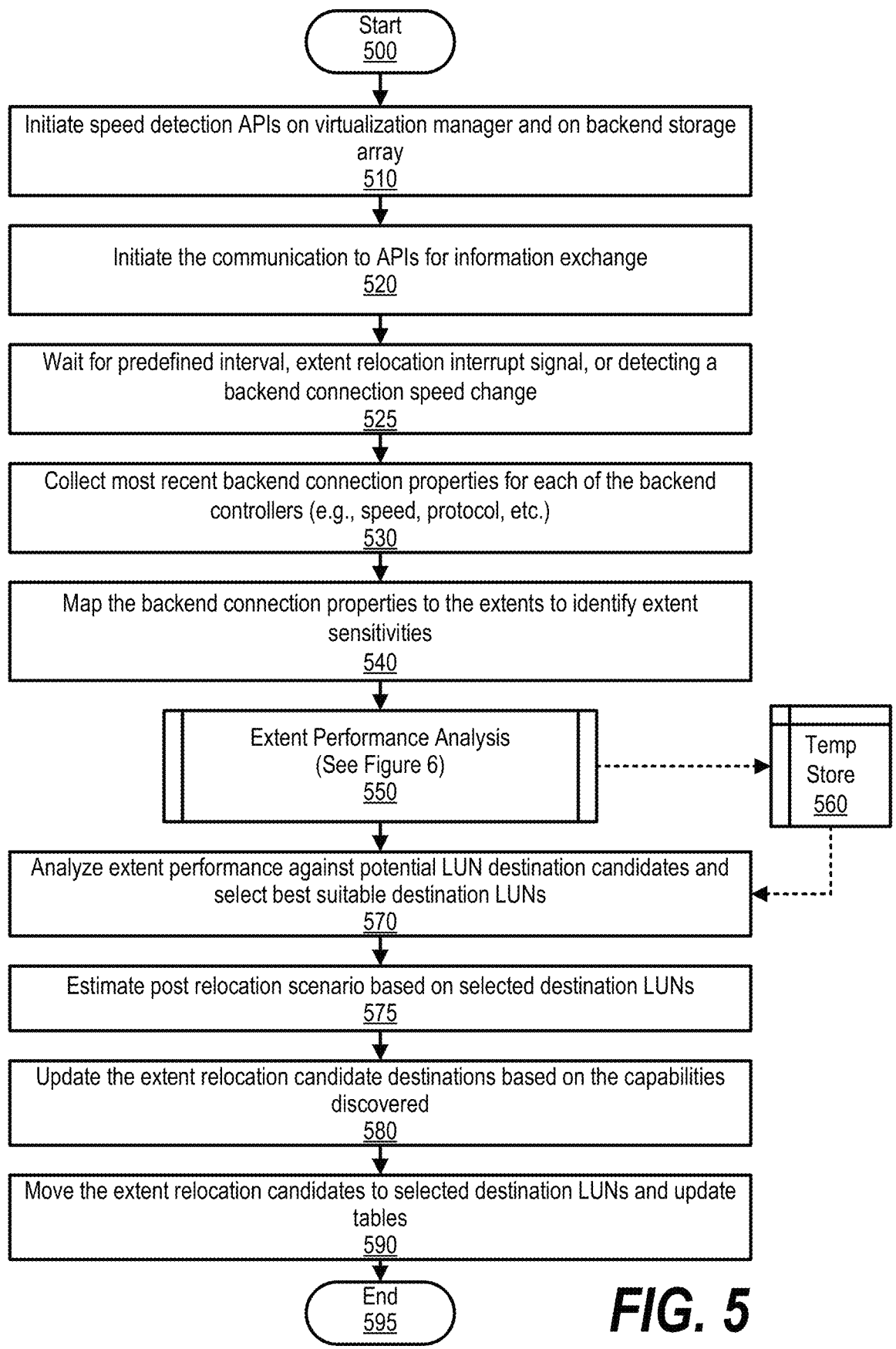
FIG. 5 is an exemplary flowchart showing steps taken to rebalance hot extents within a storage tier.

FIG. 5 is an exemplary flowchart showing steps taken to rebalance hot extents within a storage tier. FIG. 5 processing commences at 500 whereupon, at step 510, the process initiates speed detection APIs via virtualization manager 320 and discovery APIs 335 to identify backend connection properties corresponding to various backend controllers. At step 520, the process initiates communication to discovery APIs 335 for information exchange to capture the backend connection properties.

At step 525, the process waits a predefined interval (e.g., every second), an extent relocation signal, or when a target attachment speed change is detected (e.g., reduced bandwidth detection). In one embodiment the extent relocation signal is initiated by tiering manager 330 or extent balancing daemon 325. In this embodiment, the process also invokes the signal when target capabilities, characteristics, or fabric properties change, such as connection protocol, speed, etc. At step 530, the process collects the latest statistics of each extent (e.g., speed, protocol, etc.).

At step 540, the process maps the backend connection properties collected in step 530 to identify the current sensitivity of the extents. In one embodiment, tiering manager 330 determines whether a rebalancing is required based on access counters and other interrelated parameters. For each backend type (e.g., SSDs, HDDs), heat counters are specified in storage system 310 that trigger relocation steps when a certain temperature is reached.

Figure 6:
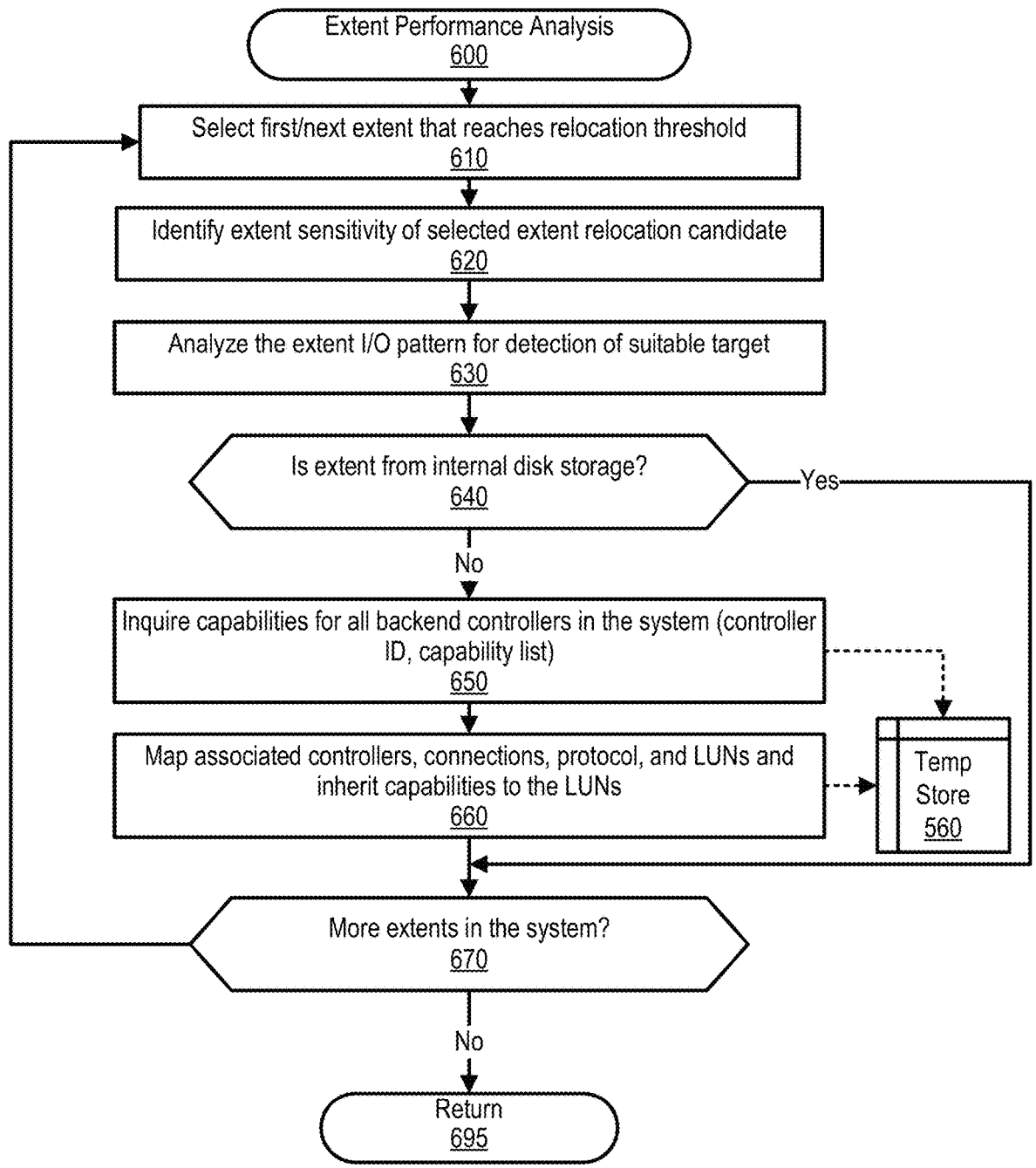
FIG. 6 is an exemplary flowchart showing steps taken to analyze extent relocation candidates relative to current backend connection property conditions.

At predefined process 550, the process analyzes the extent performance and identifies extent relocation candidates based on the current conditions of the extents (see FIG. 6 and corresponding text for processing details). In one embodiment, the process stores source backend connection properties and potential target backend connection properties in temp store 560.

At step 570, the process analyzes each extent relocation candidate's extent performance against potential LUN destination candidates and selects the best suitable destination LUNs. At step 575, the process estimates a post relocation scenario based on the selected destination LUNs. In one embodiment, the process optimizes the destination LUN selection based on three factors, which are (i) extent heat count (which is known to tiering process), (ii) interconnect protocol (which is inquired based on target controller discovery), and (iii) interconnect speed (storage controller knows negotiated values). For example, if all the hot extents are moved to a slower performing backend, then the process determines that I/O latency would increase and, in turn, select other destination LUNs for certain extent relocation candidates.

At step 580, the process updates the extent relocation candidate destinations based on the capabilities discovered, such as interconnect speed, protocol, bandwidth available, existing workload, etc. At step 590, the process moves the identified extent relocation candidates to their corresponding destination LUNs and updates the lists shown in FIG. 4 accordingly. FIG. 5 processing thereafter ends at 595.

FIG. 6 is an exemplary flowchart showing steps taken to analyze extent relocation candidates relative to current backend connection property conditions. FIG. 6 processing commences at 600 whereupon, at step 610, the process selects the first hot extent that reaches a relocation threshold. In one embodiment, the relocation threshold is based on access counters and other interrelated parameters. In another embodiment, for each backend type, heat counters are specified in storage system 310 that trigger relocation analysis when a certain temperature is reached. At step 620, the process identifies the extent sensitivity of the selected extent relocation candidate (from step 540 in FIG. 5) and, at step 630, the process analyzes the extent I/O pattern (high access/small data, low access/large data, etc.) of the selected extent relocation candidate.

The process, in one embodiment, determines as to whether the extent is from internal disk storage (decision 640). If the extent is from internal disk storage, then decision 640 branches to the 'yes' branch bypassing relocation analysis steps 650 and 660. On the other hand, if the extent is not located in internal disk storage, then decision 640 branches to the 'no' branch whereupon, at step 650, the process identifies capabilities for each of the backend controllers in the system (e.g., controller ID, capability list) based on the backend connection properties in step 530 of FIG. 5. At step 660, based on the identified capabilities, the process maps the associated controllers, connections, protocols, and LUNs and inherit capabilities to the LUNs and generates the tables in FIG. 4, which are stored in temp store 560.

The process determines as to whether there are more hot extents in the system (decision 670). If there are more hot extents in the system, then decision 670 branches to the 'yes' branch which loops back to select and evaluate the next extent. This looping continues until there are no more hot extents to evaluate, at which point decision 670 branches to the 'no' branch exiting the loop. FIG. 6 processing thereafter returns to the calling routine (see FIG. 5) at 695.

Figure 7:
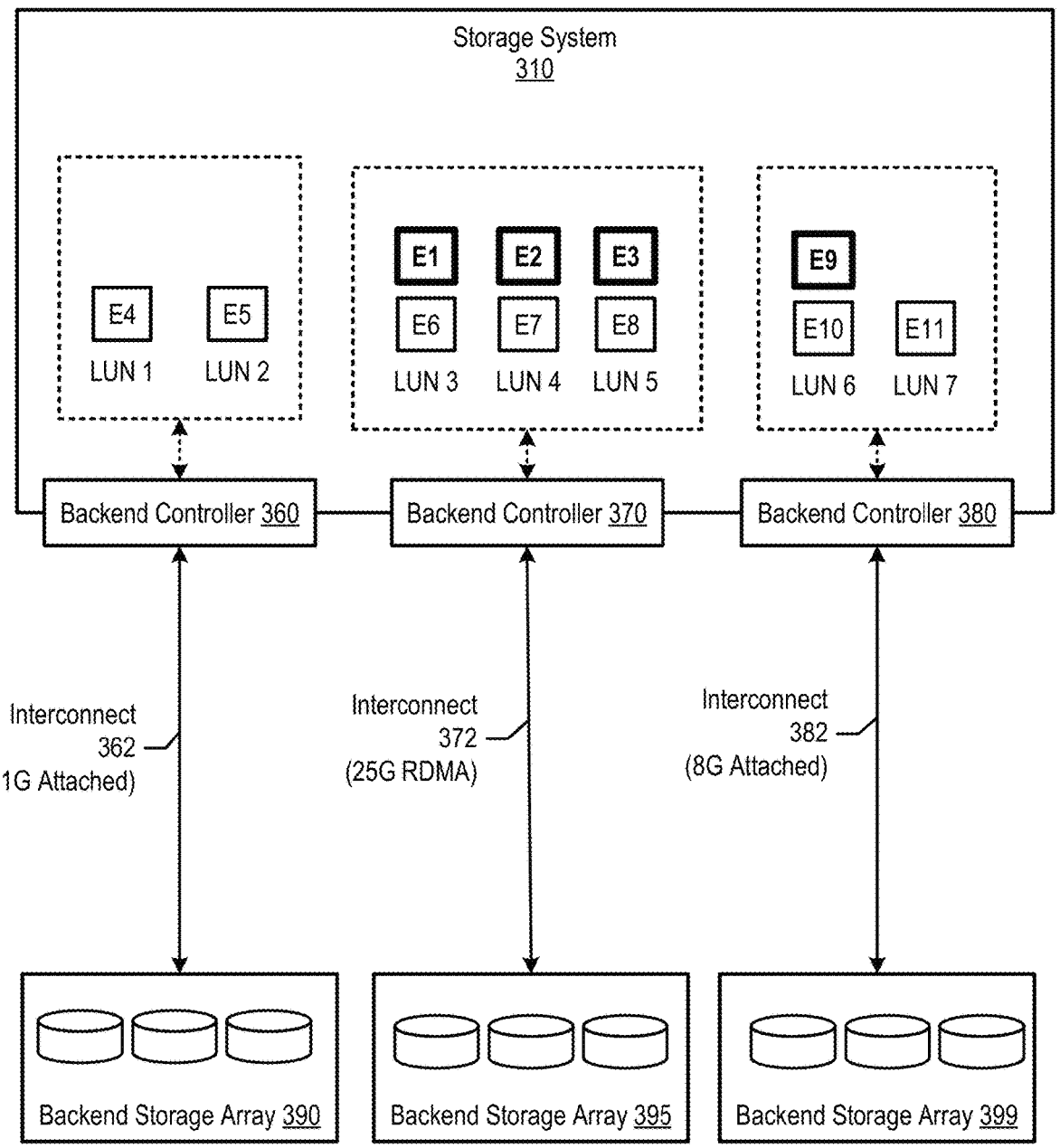
FIG. 7 is an exemplary diagram depicting a storage system that detects four hot extents.

FIG. 7 is an exemplary diagram depicting a storage system that detects four hot extents and begins extent relocation analysis steps. FIG. 7 depicts a typical storage system environment that includes three backend storage arrays 390, 395, and 399 that are connected to storage system 310 via interconnects 362, 372, and 382, respectively. A corresponding volume includes eleven extents E1, E2, E3, E4, E5, E6, E7, E8, E9, E10, and E11, which are each physically stored on one or more of the physical storage devices in backend storage arrays 390, 395, or 399. From a virtualization standpoint, the eleven extents are spread across seven LUNs LUN 1, LUN 2, LUN 3, LUN 4, LUN 5 LUN 6, and LUN 7 managed by backend controllers 360, 370, and 380.

Figure 8:
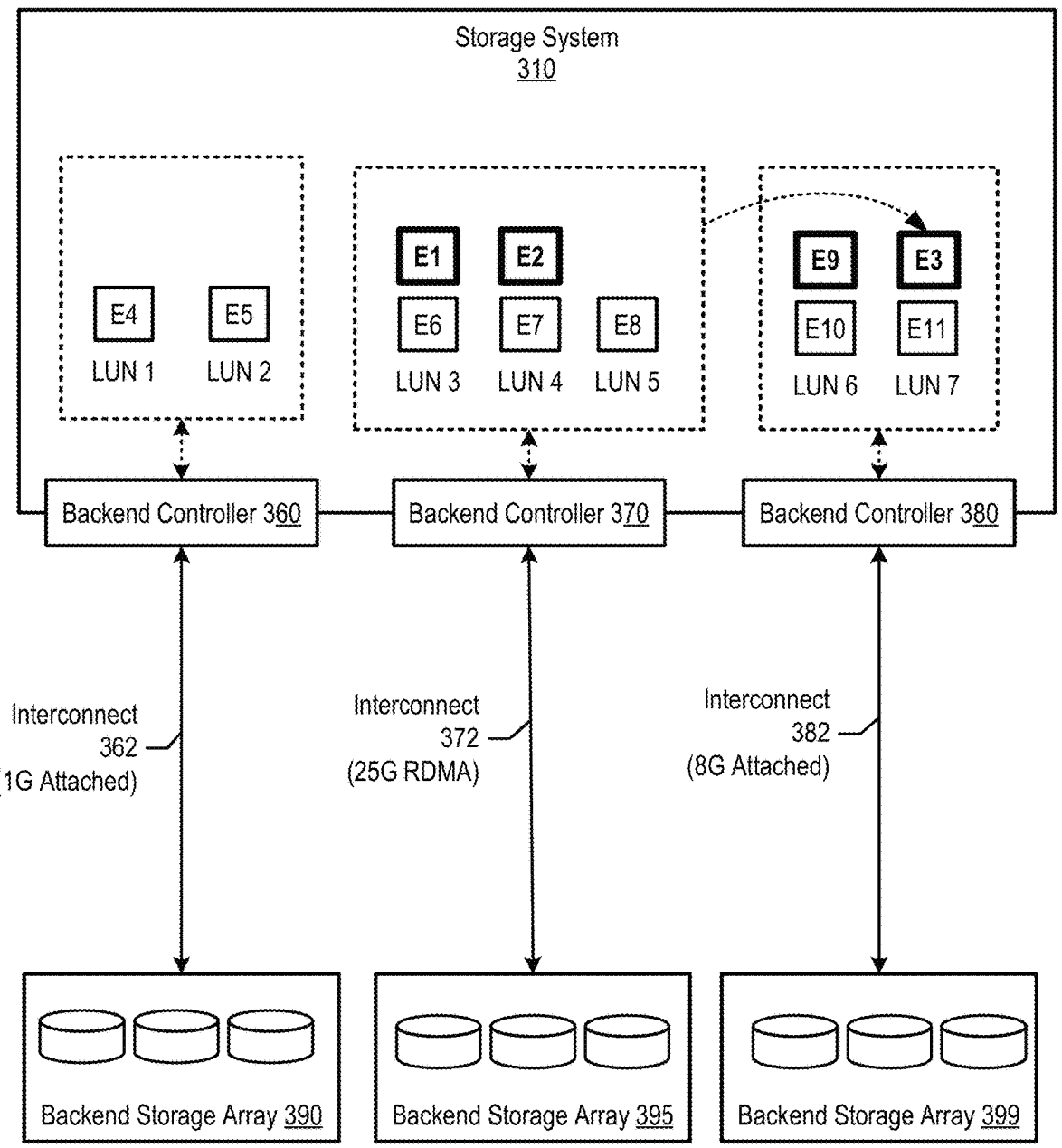
FIG. 8 is an exemplary diagram depicting a storage system that relocates extent relocation candidates to rebalance the workload between backend storage arrays.

Storage system 310 monitors the load across the extents and, when storage system 310 detects that a load rebalancing should occur, storage system 310 considers the backend connection properties of interconnects 362, 372, and 382 to relocate the extent relocation candidates (see FIG. 8 and corresponding text for further details).

FIG. 8 is an exemplary diagram depicting a storage system that relocates extent relocation candidates to rebalance the workload between backend storage arrays. In one embodiment, the process identifies relocatable extents based on the I/O access counters, interconnected protocol workload, and other interconnect speed characteristics that are mapped with the extent location and backend capabilities.

FIG. 8 shows that storage system 310 relocates extent 3 from backend controller 370's space to backend controller 380's space, thus migrating extent 3 from backend storage array 395 to backend storage array 399. Although prior systems may move extent 3 to backend controller 360's space because it currently does not have a hot extent, storage system 310 chose backend controller 380's space because interconnect 382 has an 8 Gbps bandwidth compared with interconnect 362's 1 Gbps bandwidth. As such, backend controller 380 is better equipped to handle another hot extent because interconnect 382 is eight times faster than interconnect 362.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors;
a set of computer program instructions stored in the memory and executed by at least one of the processors in order to perform actions of:
detecting, by a storage system, that an extent located on a first one of a set of physical storage devices requires relocation, wherein the set of physical storage devices are on a same tier in a multi-tier storage configuration;
identifying, by the storage system, a set of backend connection properties of each of a set of backend connections between the storage system and the set of physical storage devices, the identifying further comprising:
determining a first backend interconnect protocol between the storage system and the first physical storage device; and
determining a second backend interconnect protocol between the storage system and a second one of the set of physical storage devices, wherein the second backend interconnect protocol is different from the first interconnect protocol; and
relocating the extent from the first physical storage device to the second physical storage device based, at least in part, on evaluating the first backend interconnect protocol against the second backend interconnect protocol.

2. The information handling system of claim 1 wherein the storage system manages the multi-tier storage configuration.

3. The information handling system of claim 2 wherein the processors perform additional actions comprising:
identifying a set of backend interconnect protocols comprising a set of protocol input/output (I/O) stack overheads for each of the set of backend connections, wherein the set of backend interconnect protocols comprise the first backend interconnect protocol and the second backend interconnect protocol;
including the set of backend interconnect protocols into the set of backend connection properties to select the second physical storage device.

4. The information handling system of claim 3 wherein the processors perform additional actions comprising:
computing an extent sensitivity of the extent based on a first one of the set of backend connection properties comprising a connection bandwidth and the first backend interconnect protocol corresponding to the first physical storage device; and
selecting the second physical storage device in response to determining that a second one of the backend connection properties corresponding to the second physical storage device supports the extent sensitivity.

5. The information handling system of claim 4 wherein the processors perform additional actions comprising:
determining an access frequency of the extent by an application; and
utilizing the access frequency in the computing of the extent sensitivity.

6. The information handling system of claim 3 wherein the processors perform additional actions comprising:
providing a set of discovery application program interfaces (APIs) that discover the set of backend connection properties; and
adjusting at least one tiering threshold of the multi-tier storage configuration based on the set of backend connection properties identified by the set of discovery APIs.

7. The information handling system of claim 2 wherein the processors perform additional actions comprising:

detecting a change in a connection bandwidth corresponding to at least one of the set of backend connections; and adjusting at least one load balancing threshold in the same tier based on the change in the connection bandwidth.

8. A computer program product stored in a computer readable storage medium, comprising computer program code that, when executed by an information handling system, causes the information handling system to perform actions comprising:

detecting, by a storage system, that an extent located on a first one of a set of physical storage devices requires relocation, wherein the set of physical storage devices are on a same tier in a multi-tier storage configuration;

identifying, by the storage system, a set of backend connection properties of each of a set of backend connections between the storage system and the set of physical storage devices, the identifying further comprising:

determining a first backend interconnect protocol between the storage system and the first physical storage device; and determining a second backend interconnect protocol between the storage system and a second one of the set of physical storage devices, wherein the second backend interconnect protocol is different from the first interconnect protocol; and relocating the extent from the first physical storage device to the second physical storage device based, at least in part, on evaluating the first backend interconnect protocol against the second backend interconnect protocol.

9. The computer program product of claim 8 wherein the storage system manages the multi-tier storage configuration.

10. The computer program product of claim 9 wherein the information handling system performs further actions comprising:

identifying a set of backend interconnect protocols comprising a set of protocol input/output (I/O) stack overheads for each of the set of backend connections, wherein the set of backend interconnect protocols comprise the first backend interconnect protocol and the second backend interconnect protocol;

including the set of backend interconnect protocols into the set of backend connection properties to select the second physical storage device.

11. The computer program product of claim 10 wherein the information handling system performs further actions comprising:

computing an extent sensitivity of the extent based on a first one of the set of backend connection properties comprising a connection bandwidth and the first backend interconnect protocol corresponding to the first physical storage device; and selecting the second physical storage device in response to determining that a second one of the backend connection properties corresponding to the second physical storage device supports the extent sensitivity.

12. The computer program product of claim 11 wherein the information handling system performs further actions comprising:

determining an access frequency of the extent by an application; and utilizing the access frequency in the computing of the extent sensitivity.

13. The computer program product of claim 10 wherein the information handling system performs further actions comprising:

providing a set of discovery application program interfaces (APIs) that discover the set of backend connection properties; and adjusting at least one tiering threshold of the multi-tier storage configuration based on the set of backend connection properties identified by the set of discovery APIs.

* * * * *